(No Model.)
J. P. FLAHERTY.
DENTAL MATRIX.
No. 560,702.  Patented May 26, 1896.
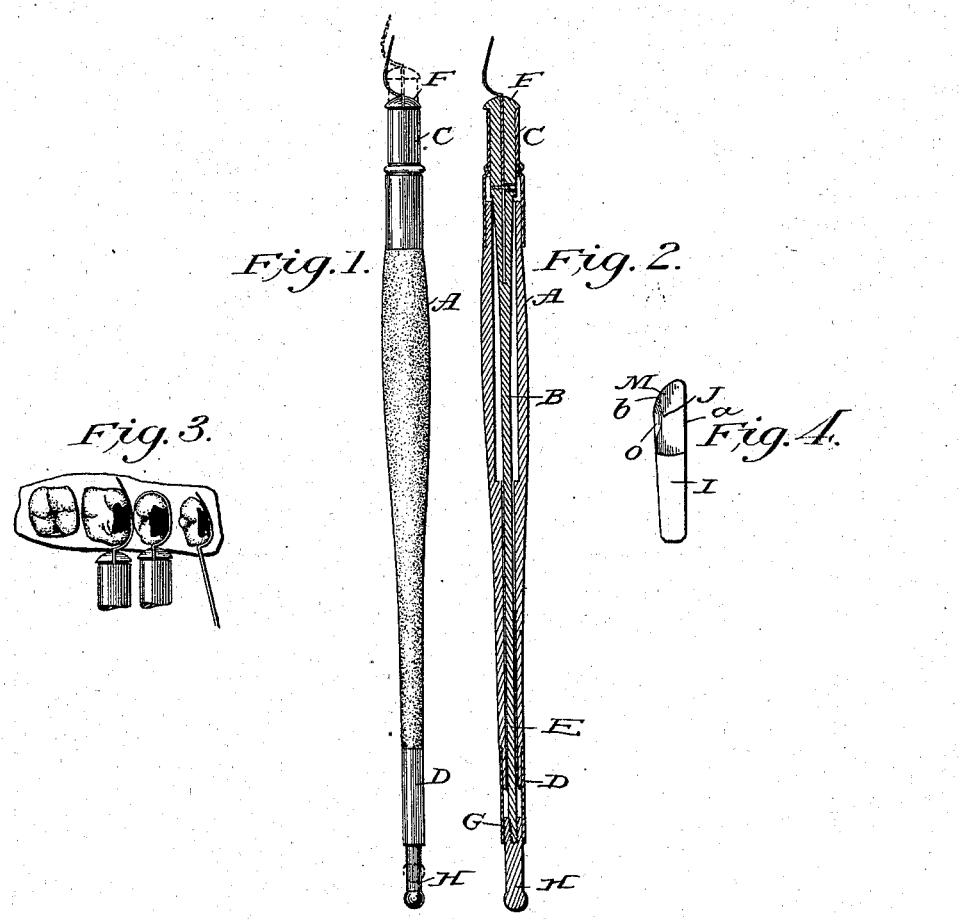
Witnesses.
Ford A. Otto.
Lillie Pfefferkorn.
Inventor.
James P. Flaherty

United States Patent Office.

JAMES P. FLAHERTY, OF WEST BEND, WISCONSIN.

DENTAL MATRIX.

SPECIFICATION forming part of Letters Patent No. 560,702, dated May 26, 1896.

Application filed April 1, 1895. Serial No. 543,998. (No model.)

*To all whom it may concern:*

Be it known that I, JAMES P. FLAHERTY, a citizen of the United States, residing at West Bend, in the county of Washington and State of Wisconsin, have invented new and useful Improvements in Dental Hand-Matrices, of which the following is a specification.

My invention relates to improvements in dental hand-matrices especially adapted to the insertion of amalgam and other plastic fillings.

The object of my invention is, first, to so combine the matrix-plate with a detachable handle that the latter may be used for inserting between the teeth any one of several plates and holding it in position while the filling is being inserted and withdrawing the same without injury to the filling.

In the following description reference is had to the accompanying drawings, in which—

Figure 1 is a side view of the matrix-holder. Fig. 2 is a central longitudinal section view of the same. Fig. 3 is a view of several of the matrices applied to the teeth. Fig. 4 is a side view of one of the matrices.

Like parts are identified throughout by the same reference-letters.

My matrix-holder is composed of a shell A, preferably of wood, and shaped much like an ordinary penholder. A longitudinal tubular opening B through the center of the shell terminates at each end in the ferrules C and D, respectively.

E is a rod provided with bifurcated conical gripping-tongs F at one end and the screw G at the other end adapted to engage with the screw-cap H. This rod E is adapted to be inserted in the holder through the ferrule C, as shown in Fig. 2, and the cap H is then inserted at the other end and screwed in place on the end of the rod E. The tongs project somewhat from the ferrule C, and when the rod is drawn or forced inward the sides of the tongs are pressed together by their contact with the ferrule. The rod E can be drawn up, as shown at Fig. 1, or pushed down by means of the cap H or by pressing on the ends of the tongs F, thus closing the tongs or permitting them to reopen accordingly.

The matrices are formed of steel or other elastic material and are provided with a flat stem I, adapted to be engaged between the tongs F. That portion J which engages against the side of the tooth is generally curved laterally, as shown in Fig. 3, one edge, a, being very thin and sharp and the other edge, b, blunt, thus appearing wedge-shaped in cross-section. The thin edge a is the upper edge of the matrix and is adapted to fit between the teeth at or near the grinding-surfaces, while the lower edge b is adapted to be pressed against the neck of the tooth that is being operated upon. The end M is rounded off toward the blunt or lower edge, leaving the sharp edge the longer, and the central portion of that side which covers the cavity in the tooth is generally made slightly concave in order to give a rounded contour to the filling.

The lateral curve of the matrices can be varied to meet the requirements of any form of tooth, and for some forms of teeth it is desirable to provide an indentation O, as shown in Fig. 4.

In use the matrix is forced between the teeth with the thin edge a slightly pressing them apart and the blunt edge b down or next to the gums and pressed firmly against the side of the tooth by means of the handle A while the filling is being inserted. On removing the matrix, by drawing the same down and out, the teeth are allowed to spring back, bringing the filling in proper contact with the adjoining tooth. The matrix being made of steel and very thin, it is elastic and under the pressure exerted on the handle accommodates itself to the sides of the cavity and enables the operator to insert the filling with great nicety and accuracy.

Having thus described my invention, what I claim as new, and desire to secure by Letters Patent, is—

A dental hand-matrix, consisting of the combination of the elastic plate, adapted to fit against and conform to the side of the tooth, and extended outward to form a handle-stem, with the handle provided with gripping-tongs, adapted to engage said stem and hold the same firmly therein, substantially as described.

In testimony whereof I affix my signature in the presence of two witnesses.

JAMES P. FLAHERTY.

Witnesses:
 JOHN REISSE,
 JOS. F. HUBER.